United States Patent
Szumski et al.

[15] 3,678,150
[45] July 18, 1972

[54] PROCESS FOR IMPROVING THE STABILITY OF PPD, QT AND HISTOPLASMIN ON TINE APPLICATORS

[72] Inventors: Stephen Aloysius Szumski; Donald Walter McCoy, both of Pearl River, N.Y.

[73] Assignee: American Cyanamid Company, Stamford, Conn.

[22] Filed: July 27, 1971

[21] Appl. No.: 166,578

Related U.S. Application Data

[63] Continuation-in-part of Ser. No. 686,331, Nov. 28, 1969, abandoned, which is a continuation-in-part of Ser. No. 793,611, Jan. 23, 1969, abandoned.

[52] U.S. Cl. ...................................424/12, 128/2, 128/253, 424/14, 424/88, 424/92
[51] Int. Cl. ..........................................................A61k 27/12
[58] Field of Search ..........................128/2, 253; 424/12, 92

[56] References Cited

UNITED STATES PATENTS

| | | | |
|---|---|---|---|
| 2,190,745 | 2/1940 | Vollmer | 128/2 |
| 2,282,754 | 5/1942 | Bickert | 424/12 |
| 2,779,332 | 1/1957 | Corper et al. | 128/253 |
| 2,866,452 | 12/1958 | Laub | 128/2 |
| 2,908,614 | 10/1959 | Muggleton et al. | 424/92 |
| 3,135,663 | 6/1964 | Muggleton et al. | 424/92 X |
| 3,221,739 | 12/1965 | Rosenthal | 128/253 |
| 3,221,740 | 12/1965 | Rosenthal | 128/253 |
| 3,322,632 | 5/1967 | Schwick et al. | 424/12 |
| 3,452,135 | 6/1969 | Medveczky | 424/9 |

OTHER PUBLICATIONS

Heaf Lancet, July 28, 1951, pp. 151– 152, " The Multiple–Puncture Tuberculin Test."
Rosenthal J.A.M.A. 177(6): 452– 454, Aug. 12, 1961, " The Disc–Tine Tuberculin Test."
" Tuberculin Tine Test," Lancet, Oct. 23, 1965, pp. 837– 838.

*Primary Examiner*—Shep K. Rose
*Attorney*—Stephen Raines

[57] ABSTRACT

In accordance with this invention, the stability of Old Tuberculin, Tuberculin Purified Protein Derivative (PPD) or histoplasmin coated on the tines of injectors by way of a single dip technique is greatly improved by combining said biologicals with acacia and a material selected from the group consisting of lactose, glucose and mixtures thereof.

4 Claims, No Drawings

PROCESS FOR IMPROVING THE STABILITY OF PPD, QT AND HISTOPLASMIN ON TINE APPLICATORS

CROSS REFERENCE TO RELATED APPLICATIONS

This application is a continuation-in-part of our copending application Ser. No. 686,331, filed Nov. 28, 1967, now abandoned, which in turn is a continuation-in-part of our copending application Ser. No. 793,611, filed Jan. 23, 1969 now abandoned.

SUMMARY OF THE INVENTION

The present invention relates to a process for improving the stability of tuberculin and histoplasmin products used in diagnostic skin tests in human beings. More particularly, the present invention provides a method for stabilizing histoplasmin, Old Tuberculin or Tuberculin Purified Protein Derivative (PPD) while in the form of a relatively thin coat.

The term "tuberculin product" as used herein is meant to include both Old Tuberculin and PPD.

Presently, a widely employed test for detecting changes in tuberculosis antibodies in human beings involves intracutaneously injecting the human being with a tine coated with tuberculin product. Tuberculin product, especially PPD, although relatively stable in bulk form exhibits pronounced instability when in the form of a relatively tine coat.

While it has been found that the tuberculin product which is placed on the tines by way of a coating procedure utilizing eight coats is stable to ethylene oxide sterilization and storage for a period of approximately three years at room temperature, a single coated tine loses over 50 percent of its potency during sterilization and an additional 50 percent on storage over a 7 day period at 37°C.

The use of a method which requires eight coats applied over a 2 day period is economically undesirable. Such a procedure is not readily adaptable to automation, in addition to being very time consuming.

This invention describes mixtures of materials what when incorporated with the tuberculin or histoplasmin product enables a stable single coated tine to be prepared. The mixtures which are described give not only a stable product but also have all the necessary physical properties required for the tine to be of a pharmaceutically acceptable nature.

In arriving at a material to stabilize the tines numerous problems are encountered such as when certain antioxidants, for example sodium glutamate, sodium thioglycollate, sodium citrate and ascrobic acid are employed which may be expected to stabilize the tuberculin product to ethylene oxide sterilization the concentrations one may use is limited. It is found that concentrations of about 0.1 percent does not retard inactivation; however, sodium glutamate shows stabilizing effects at over 20 percent concentration levels, but at these levels patient sensitivity problems may be present. Dextran is found not to significantly improve stabilization at 7.4 percent while acacia at 7.5 percent significantly enhances stability to sterilization and storage. However, acacia also possesses a certain disadvantage, while increasing concentration improves stability, this material quickly reaches a point of viscosity which is pharmaceutically undesirable for use on tines. A similar problem exists with carboxymethylcellulose which at 0.32 percent does not enhance stability and over 0.5 percent is of too great a viscosity to be used for a coating material. While high concentrations of glycerine create moisture absorbency problems and human albumin creates viscosity problems, lactose does stabilize the tuberculin preparations; however, it is not as efficient as acacia. It has now been found that a combination of certain materials gives a stabilized preparation after only one dipping of the tine in addition to resulting in a product which is pharmaceutically acceptable. The concentrations chosen incorporate the desirable stabilizing properties of the materials to the exclusion of most disadvantages. Thus the amount of acacia is limited to 3 to 10 percent which is coupled with lactose (3 to 9 percent) and/or glucose (20 to 50 percent). These combinations utilize the high stabilizing effect of acacia in addition to relying partially on the non toxic sugars to give some stability. This avoids a high concentration of acacia resulting in excessive viscosity. In addition, the sugars which do contribute to a certain degree to the stability also make for a preparation less likely to result in sensitivity reactions due to the low degree of human sensitivity traditionally associated with these sugars.

Thus the object achieved by the invention is to place histoplasmin or tuberculin materials in a simple coat form and making these materials stable against deterioration by mixing the product in bulk form, prior to coating a surface such as a tine, with a mixture comprising (a) acacia, and (b) glucose and/or lactose. It would be expected that since tuberculin product in bulk form is stable when exposed to normal atmosphere and temperature conditions it should retain its stability under the same atmosphere and temperature conditions when it is applied in coat form. However, as noted above, this stability is not retained when tuberculin product is in coat form. No theory is advanced as to why this stability problem should occur. The fact that by this invention tuberculin coatings can be stabilized by mixing the materials noted above with the tuberculin in bulk form tends to preclude the conclusion that the normal atmospheric and temperature conditions alone cause this deterioration since the bulk-stabilized tuberculin product retains its stability in coat form when exposed to these conditions. The fact that the materials noted above for mixing with tuberculin product in bulk form improve stability of the coat is especially surprising since these materials are not normally regarded as stabilizing agents.

It should be noted that the particular intracutaneous injector or tine employed in the process of this invention is not critical. The tines may have one or more prongs and be of a single use disposable type or of a multiple use kind; however, generally a single use tine of about four prongs is utilized. Representative injectors which can be employed herein are disclosed by U.S. Pat. Nos. 2,619,962, 2,893,392, 3,123,212, 3,221,739 and 3,221,740 which are incorporated herein by reference.

When employing a stabilizing agent with histoplasmin or tuberculin product, the amount employed depends upon the particular stabilizing agent employed. The stabilizing agent is added to the product in amounts so that stabilization is effected while maintaining sufficient concentration of product to carry out the test. The acacia can be employed in amounts of 3 to 30 weight percent based upon the weight of the stabilized product. Acacia in amounts greater than about 30 weight percent results in a product having undesirably high viscosity which increases the difficulty of administration. The preferred range is between 3 to 10 weight percent. Glucose can be present in amounts of 20 to 50 weight percent based upon the weight of stabilized product, lactose can be present in amounts of from 3 to 9 weight percent based upon the weight of stabilized product or mixtures of glucose and lactose may be employed. The use of lactose and/or glucose in amounts greater than set forth above does not materially improve the stability of the product and furthermore becomes difficult to dissolve therein. Representative mixtures of histoplasmin or tuberculin product and stabilizing agent are a mixture containing 3 to 10 weight percent acacia, and 3 to 9 weight percent lactose.

After the histoplasmin or tuberculin coated tine is stabilized or coated, the tine is stored for later use as desired.

The following examples are representative of the present invention and show the improvement in stability for tuberculin product coats obtained by employing the present invention.

EXAMPLE 1

Stabilization of Old Tuberculin with Acacia and Lactose

A mixture of 70 grams of acacia and 85 grams of lactose are thoroughly blended and placed in a suitable dispenser. The blend is sterilized with ethylene oxide and then added aseptically to one liter of previously sterilized bulk Old Tuberculin concentrate with continuous agitation from a magnetic stirrer. Alternatively, sterilization can be effected after mixing of the Old Tuberculin, acacia and lactose. After the powder is completely dissolved, the mixture is dispensed aseptically into 10 ml. vials and held frozen until used.

This Old Tuberculin mixture containing stabilizers is applied to intracutaneous injectors such as those described in U.S. Pat. No. 3,123,212. Stability studies performed on these injectors showed that the Old Tuberculin was completely stable after at least 334 days at 37°C. and 300 days at 45°C.

EXAMPLE 2

Stabilization of Tuberculin Purified Protein Derivative with High Levels of Glucose A mixture of 70 grams of acacia and 50 grams of lactose is thoroughly blended and sterilized with ethylene oxide. 400 grams of glucose is sterilized with ethylene oxide. All of these sterilized powders are added aseptically to 1 liter of Tuberculin Purified Protein Derivative which is under agitation by a magnetic stirrer. After the powders are completely dissolved, the mixture is dispensed aseptically into 10 ml. vials and stored in a frozen state. The tuberculin purified protein derivative containing the stabilizers is applied to intracutaneous injectors such as those described in U.S. Pat. No. 3,123,212. Stability studies performed on these injectors showed that the tuberculin purified protein derivative was 100 percent stable for at least 275 days at 37°C.

EXAMPLE 3

Stabilization of Histoplasmin with Acacia and Lactose

A mixture of 45 grams of acacia and 85 grams of lactose are thoroughly blended and placed in a suitable dispenser. The blend is sterilized with ethylene oxide and then added aseptically to 1 liter of previously sterilized bulk histoplasmin concentrate with continuous agitation from a magnetic stirrer. Alternatively, sterilization can be effected after mixing of the histoplasmin, acacia and lactose. After the powder is completely dissolved, the mixture is dispensed aseptically into 10 milliliter vials and held frozen until used.

This histoplasmin mixture containing stabilizer is applied to intracutaneous injectors such as those described in U.S. Pat. No. 3,123,212. Stability studies performed on these injectors showed that the histoplasmin was completely stable after at least 565 days at 37°C. and 565 days at 45°C.

We claim:

1. A disposable single use throw-away type intracutaneous tuberculosis testing multiple puncture injector with a plurality of tines coated and a single coat of a stabilized mixture of tuberculin product comprising a tuberculin product, 3 to 10 percent acacia and a member selected from the group consisting of 3 to 9 percent lactose, 20 to 50 percent glucose and mixtures thereof.

2. The composition of claim 1 wherein acacia is 7 percent and lactose is 8.5 percent.

3. A disposable single use throw-away type intracutaneous multiple puncture injector with a plurality of tines and a single coat of a stabilized mixture of histoplasmin product comprising histoplasmin product, 3 to 10 percent acacia and a member selected from the group consisting of 3 to 9 percent lactose, 20 to 50 percent glucose and mixtures thereof.

4. The composition of claim 3 wherein acacia is 4.5 percent and lactose is 8.5 percent.

* * * * *